Figures 1, 2, 3, 4, 5, 6, 7, 8:
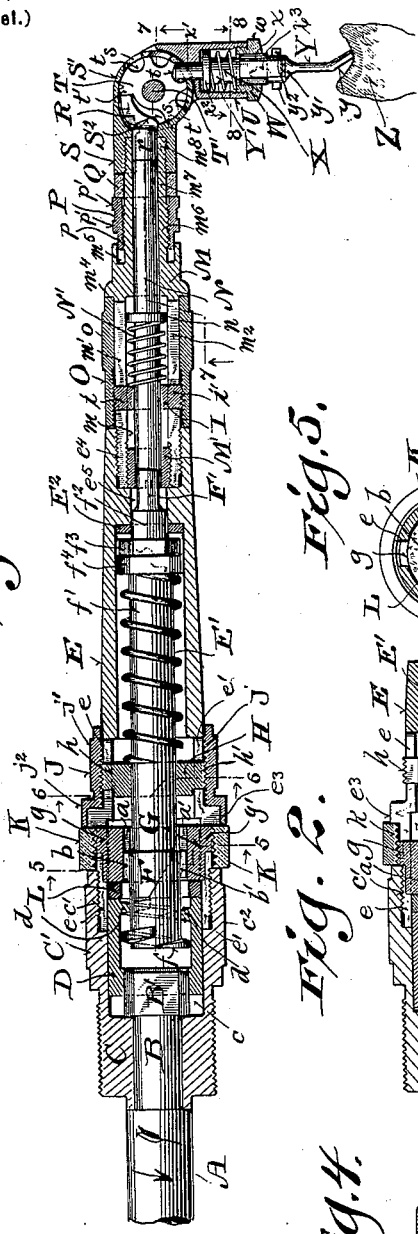

No. 667,464. Patented Feb. 5, 1901.
C. H. SEEGER & N. DEDRICK.
DENTAL TOOL.
(Application filed Apr. 21, 1900.)
(No Model.) 2 Sheets—Sheet 1.

Witnesses:
Geo. W. Young.
B. C. Roloff.

Inventors:
Carl H. Seeger
Nicholas Dedrick.
By H. G. Underwood
C. Worney

THE NORRIS PETERS CO., PHOTO-LITHO., WASHINGTON, D. C.

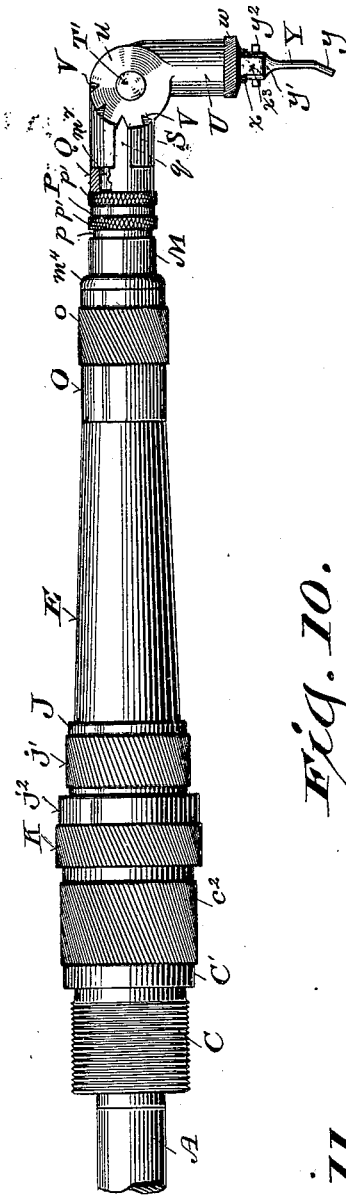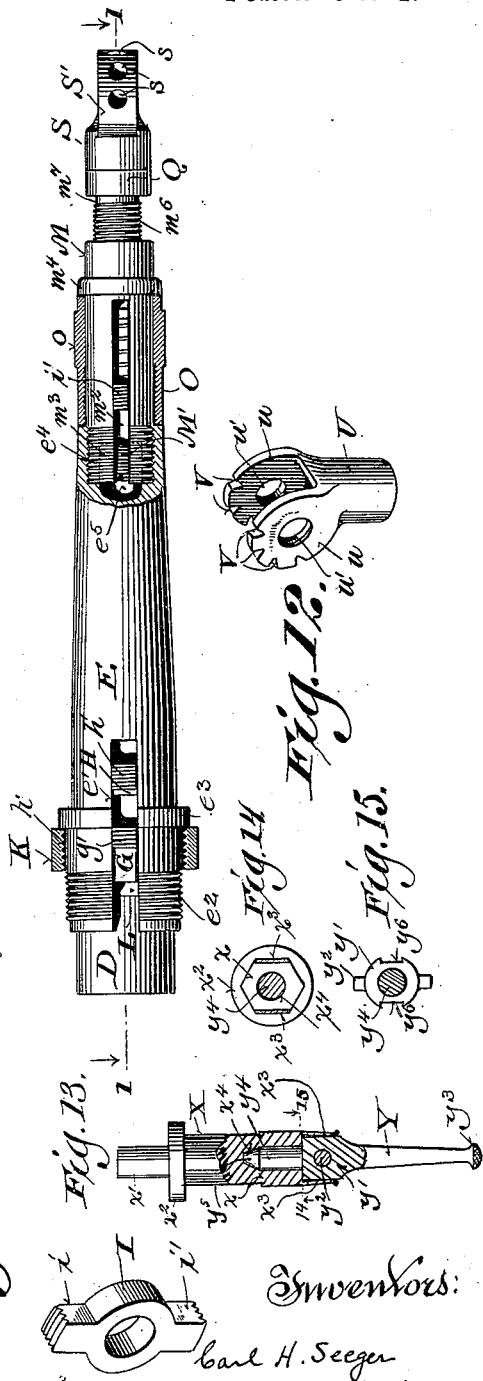

UNITED STATES PATENT OFFICE.

CARL H. SEEGER AND NICHOLAS DEDRICK, OF MANITOWOC, WISCONSIN.

DENTAL TOOL.

SPECIFICATION forming part of Letters Patent No. 667,464, dated February 5, 1901.

Application filed April 21, 1900. Serial No. 13,693. (No model.)

*To all whom it may concern:*

Be it known that we, CARL H. SEEGER and NICHOLAS DEDRICK, citizens of the United States, and residents of Manitowoc, in the county of Manitowoc, and State of Wisconsin, have invented certain new and useful Improvements in Dental Tools; and we do hereby declare that the following is a full, clear, and exact description thereof.

Our invention relates to that class of dental tools employed for filling cavities in teeth; and it consists in certain peculiarities of construction and combination of parts, as will be fully set forth hereinafter, in connection with the accompanying drawings, and subsequently claimed.

In the said drawings, Figure 1 is a longitudinal sectional view of our improved device, taken on the line 1 1 in Fig. 10. Fig. 2 is a similar sectional view of one end thereof, with the movable parts in a different position. Fig. 3 is an end view, and Fig. 4 is a sectional view, of a nut shown in the preceding views. Figs. 5 and 6 are detail transverse sectional views taken, respectively, on the lines 5 5 and 6 6 in Fig. 1. Fig. 7 is a detail longitudinal sectional view taken on the line 7 7 in Fig. 1 and drawn to an enlarged scale. Fig. 8 is a detail transverse sectional view taken on the line 8 8 in Fig. 1. Fig. 9 is a side elevation of our said device. Fig. 10 is a bottom plan view of the same with portions removed. Figs. 11 and 12 are detail perspective views of detached parts. Fig. 13 is a partly-sectional view of the plugger-point, and Figs. 14 and 15 detail sectional views on the line 14 and 15 thereof.

Referring to the drawings, A represents the end piece to which the ordinary flexible shaft (not shown) common in the dental art is attached. This piece A has a short shaft B projecting therefrom and through a longitudinal bore in the solid outer end of the hollow cap C, after which a square-sided head B' is secured to the adjacent projecting end of said shaft B. The exterior surface of this solid end of the cap C is screw-threaded, as shown, to receive the adjacent end of the casing (not shown) of the flexible shaft and forward of this point the cap C is increased in diameter, as shown at C', which part, by reason of the bore $c$, forms a shell, the forward part of this shell having its bore of increased diameter and provided with interior screw-threads, as shown at $c'$, the main bore $c$ being of a size to just receive the nut D, (shown in detached detail views, Figs. 3 and 4,) and the supplemental screw-threaded bore $c'$ being adapted to receive and engage with the adjacent exteriorly-screw-threaded end $e^2$ of the tubular casing E. (Best shown in Fig. 10.) The part C' of the cap is provided with an exterior roughened or milled surface $c^2$ for convenience in assembling the parts together, and the bore $c$ in the cap C coincides with the bore at the adjacent end of the tubular casing E, so that the nut D may have uninterrupted movement within both. The said nut D has a single spiral open cam-thread $d$ projecting within its bore at one end and a square-sided opening $d'$ at its other end, of shape and size corresponding to that of the described head B', so that said nut D may have longitudinal movement on said head as the nut moves back and forth within the bore $c$ in the cap C.

F is a longitudinally-reciprocating drive-rod having an intermediate portion $f'$ of decreased diameter and a forward portion $f^2$ of still further reduced diameter and terminating in a hammer F' of still less diameter, the opposite end of the rod F, which extends within the bore of the nut D, having a single spiral open cam-thread $f$ thereon for engagement with the like cam-thread $d$ of said nut. In order to keep the drive-rod F from rotating, it is provided with upper and lower feathers $b$ $b'$, which have movement within corresponding slots or grooves $a$ $a'$, formed in a sleeve G, which surrounds the drive-rod F. This sleeve G has upper and lower screw-threaded projections $g$ $g'$ similar to the projections $i$ $i'$ on the sleeve I (shown in Fig. 11) and to be presently described, the said projections $g$ $g'$ being adapted for engagement with the interior screw-threads $k$ on the collar K, whereby the said sleeve G may be moved by said collar against the ring or washer L, the said threaded projections $g$ $g'$ moving in upper and lower slots $e$ $e'$ in the tubular casing E and the said ring or washer L bearing against the adjacent end of the nut D, all as indicated in Figs. 1, 2, and 10. The exterior surface of the collar K is preferably roughened or milled for greater ease of manipulation, as shown in Fig. 9. The tubular casing E has an annular flange $e^3$ formed upon it, (best shown in Fig. 10,) and the described collar K is located between the rear edge of this flange $e^3$ and the forward edge of the part C' of the cap C, so that said collar K will be kept from longitudinal movement when it is rotated to adjust the sleeve G longitudinally. The described slots $e\ e'$ in the tubular casing E extend forward of this flange $e^3$, as well as backward therefrom, to permit longitudinal travel of another sleeve H, which is loose upon the intermediate part $f'$ of the drive-rod F, said sleeve having upper and lower screw-threaded projections $h\ h'$, adapted to be moved in said slots $e\ e'$ by engagement with the interior screw-threads $j$ on the collar J, which collar has a roughened or milled exterior surface $j'$ for greater ease of manipulation and a shouldered flange $j^2$ at its rear end, which fits over the described annular flange $e^3$ on the tubular casing E and bears against the forward edge of the collar K, all as best shown in Figs. 1 and 10.

The tubular casing E at its forward end is provided with interior screw-threads $e^4$ for the reception of the exteriorly-screw-threaded rear end of the supplemental tubular casing M, hereinafter described, the bore at this forward end of said casing E being of the same diameter as that which receives the intermediate part $f'$ of the drive-rod F, while just back of the said forward end the casing E has its bore contracted, as shown at $e^5$, to a size just sufficient to admit the part $f^2$ of said drive-rod, which part $f^2$ is screw-threaded and fitted with a pair of jam-nuts $f^3\ f^4$, the said nuts in Fig. 1 concealing the screw-threads on said part $f^2$ of the rod, while a strong spiral spring E' surrounds the intermediate part $f'$ of the drive-rod F, one end of said spring E' bearing against the forward face of the sleeve H and the other end of said spring bearing against the rear face of the nut $f^4$.

$E^2$ is a gasket or ring, of suitable soft material, whose opening coincides in size and shape with that of the described bore $e^5$ and which bears against the rear face of the metal of the casing surrounding said bore, so as to receive the impact of the nut $f^3$ in the forward stroke of the drive-rod F, as hereinafter described, and thus deaden the noise and decrease the jar of said impact.

The supplemental tubular casing M just referred to is provided with a longitudinal bore therethrough, the rear part of which (extending practically about half-way through) being of much greater diameter than the forward part of the same, which latter is of proper diameter to just receive the supplemental drive-rod N, said rod being of the same diameter as that of the hammer F' at the forward end of the drive-rod F. The said rear part of the said bore is marked $m$, and the rear end of the casing M is provided with upper and lower slots $m'\ m^2$ in line therewith, said rear end having exterior screw-threads $m^3$, which engage with the interior screw-threads $e^4$ of the casing E when the two casings E and M are united, as shown in Figs. 1 and 10, and also interior screw-threads for engagement with a screw-threaded plug M', which has a bore of proper size to receive the forward end of the hammer F' and rear end of the supplemental drive-rod N, as shown in said Fig. 1. The sleeve I (shown in Fig. 11 and hereinbefore referred to) is slipped loosely on the rod N, and the screw-threaded projections $i\ i'$ on said sleeve have travel in the just-described slots $m'\ m^2$ when the collar O is turned, this collar having an interiorly-screw-threaded rear end for engagement with the projections $i\ i'$ of said sleeve and the said collar surrounding the said casing M and being kept from longitudinal movement by its location between the front edge of the casing E and an annular shoulder $m^4$ on the casing M. The collar O is provided with a roughened or milled surface $o$ for the more ready manipulation thereof, as best shown in Fig. 10. The casing M just forward of the said shoulder $m^4$ is formed with a longitudinal annular socket $m^5$, forward of which it is reduced in diameter and exteriorly screw-threaded, as shown at $m^6$, then continued in a smooth cylindrical portion $m^7$ of slightly-reduced diameter, and terminates in a still further reduced externally-screw-threaded end $m^8$, all as best shown in Fig. 7.

P represents an interiorly-screw-threaded collar adapted for engagement with the screw-threaded part $m^6$ of the casing M, said collar having its rear end $p$ of reduced exterior diameter, whereby when necessary in the adjustment of the parts the said reduced end of the collar can be screwed toward the rear, being then received within the described longitudinal annular socket $m^5$. The said collar P is provided with a pair of roughened or milled surfaces $p'\ p'$ for greater convenience of manipulation.

Q is a smooth-bored collar having a pair of forwardly-projecting pointed tongues $q\ q$ extending from the opposite sides thereof, said collar being adapted for movement on the smooth cylindrical portion $m^7$ of the casing M. The supplemental drive-rod N extends within the bore of the casing M to a point just forward of the line of the described collar P, and at a point back of the line of the described shoulder $m^4$ and within the larger bore $m$ of the casing M the said rod N is provided with a collar $n$, and N' represents a spiral tension-spring, one end of which bears against the rear face of the said collar $n$ and the other end against the front face of the sleeve I.

R represents a dog, and $r$ the rounded shank thereof, which latter is of the same diameter as that of the supplemental drive-rod N, so as to have travel within the forward part of the bore in the described casing M, and S designates the rounded tubular rear end or neck of the hollow head S' of the device. This tubular neck has interior screw-threads for engagement with the reduced screw-threaded end $m^3$ of the casing M and a throat or opening leading into the hollow head S′ of a size and shape to just receive the rounded shank $r$ of the dog R. The said head S′, excepting where it joins the neck, is of generally circular outline with straight sides and is of less extent transversely than the diameter of the neck, as best shown in Fig. 10, and one of said sides is closed and the other has an opening therein for the admission of the dog R and the wiper T, hereinafter described, after which the said side opening is closed by a plate $S^2$, as shown in Fig. 7. The rounded or peripheral edge of said head S′ is provided with a series of round perforations $s\ s\ s$ therethrough, as shown best in Figs. 1 and 10. The wiper T consists of a metallic disk partially cut away to afford space for the dog R, whose extreme forward end is adapted to strike against the upper rear edge $t'$ of said wiper, which latter has a series of edge notches $t\ t\ t$, corresponding in number and relative location to the perforations $s\ s\ s$ in the surrounding edge of the hollow head S′, the said wiper having, further, a central round transverse hole, whereby it is loosely mounted on a pivot-screw T′, which passes through corresponding holes in the plate $S^2$ and opposed side of the head S′.

U represents a hollow cylinder having a pair of ears $u\ u$ projecting from opposite sides of the upper or inner end thereof, said ears having series of notches V V therein for engagement with the pointed ends of the tongues $q\ q$, which project from the collar Q, and said ears are further formed with round transverse holes $u'\ u'$ therethrough, all as best shown in Fig. 12, for the reception of the described transverse pivot-screw T′, one of said holes being preferably screw-threaded for the ready securing of the screw-threaded end of said pivot-screw. The upper or inner end of the cylinder U between the ears $u\ u$ is solid save for a central longitudinal bore and is concavely rounded to engage with the rounded edge of the head S′, whereby the said cylinder may be turned on the pivot-screw T′ at any angle desired (within limits) to the said head. The lower or outer end of the cylinder U is formed with interior screw-threads for engagement with the exterior screw-threads on the bushing W, which latter has an outer annular flange or band $w$, preferably roughened or milled for greater ease of manipulation, and a central polygonal-shaped bore for the reception of the similarly-shaped lower part $x$ of the plugger-shank X. The said shank has a collar $x^2$ fitted thereon, and above or beyond this one end of the shank is reduced in diameter, as shown at $x'$, to enable same to move through one of the perforations $s$ in the edge of the head S′ and within the corresponding edge notch $t$ of the wiper T, and from two of the opposite faces of the said polygonal-shaped part $x$ there extend a pair of spring gripping-jaws $x^3\ x^3$, which incline inwardly, so as to bear against the adjacent opposed flat channeled faces of the upper end of the plugger-point, as hereinafter described, and the said polygonal-shaped part $x$ is formed with a socket $x^4$ (whose walls preferably converge at the upper end) to receive the hereinafter-described projecting post on the said upper end of the plugger-point when the latter is in place.

Y represents a plugger-point, that shown in Figs. 1 and 9 having an inclined operative end $y$ and that shown in Fig. 13 having its lower end rounded and roughened, as shown at $y^3$, our tool being adapted for use with a series of interchangeable plugger-points, each of which is formed with an enlarged upper end $y'$, having a post $y^4$ projecting longitudinally therefrom, and the upper end of said post being preferably tapered, as shown at $y^5$. The opposed flat channeled faces of the upper end $y'$ of the plugger-point are best shown at $y^6\ y^6$ in Fig. 15, (wherein the spring-jaws $x^3\ x^3$ are omitted,) the said spring-jaws being shown as bearing against said flat faces in Fig. 13, there being a pin $y^2$ driven transversely through the said part $y'$ to form a convenient finger-grasp in adjusting the plugger-point—as, for example, from the position shown in Fig. 1 to the position shown in Fig. 9. Y′ designates a spiral spring within the cylinder U, which surrounds the said shank X, one end of said spring bearing against the collar $x^2$ and the other end against the bushing W. Z designates a tooth being operated upon.

The operation of our device will be readily understood from the foregoing description of its construction, taken in connection with the accompanying drawings.

The revolution of the ordinary flexible shaft to which, as described, the piece A, with its short shaft B, is attached, serves to turn the nut D, (by reason of the engagement of the head B′ within the end opening $d'$ in said nut,) and the cam-thread $d$ of the nut thereby engages with the cam-thread $f$ on the longitudinally-reciprocating drive-rod F, and thereby draws said drive-rod F backward against the tension or force of the spring E′, which spring, when the cam-threads become disengaged, forces said drive-rod F forward, so that the hammer F′ at the extreme forward end of said drive-rod is forced against the adjacent end of the supplemental drive-rod N, and this forces the forward end of the said drive-rod N against the adjacent end of the shank $r$ of the dog R, which dog, striking against the upper rear edge $t'$ of the wiper T, partly rotates the latter on its pivot T′, and thereby forces the plugger-shank X downward or outward, as the upper or inner end $x'$ of said shank is within one of the edge notches $t$ of said wiper, and as the latter thus depresses or forces outward the said plugger-shank the plugger-point Y, firmly held by its shank, is driven to place in the tooth being operated upon. By the hereinbefore described construction of our device the drive-rod F may be adjusted to give either a full stroke when the parts are as shown in Fig. 2 or a partial or lesser stroke when the parts are set, as in Fig. 1, with the nut D adjusted to a position forward of its extreme backward limit, which is done by proper manipulation of the collar K working on the threaded projections $g$ $g'$ of the sleeve G, this movement of the sleeve G being longitudinal only within the described upper and lower slots $e$ $e'$ of the tubular casing E, and the movement of the drive-rod F being also merely longitudinal by reason of the feathers $b$ $b'$ thereon and the corresponding slots or grooves $a$ $a'$ within said sleeve G. By similarly turning the described collar J, and thereby causing the longitudinal movement of the sleeve H upon the intermediate part $f'$ of the drive-rod F, the spring E' is compressed or allowed to expand to vary the strength thereof as desired. The spring N' is what we term the "tension-spring," and by turning the collar O in one direction the sleeve I is thereby moved backward until all tension is taken off said spring N', and then the rear end of the supplemental drive-rod N is always in contact with the forward end of the hammer F', so that the plugger-point Y is successively and regularly operated in continuous reciprocation by the revolution of the flexible shaft; but it frequently happens that it is desirable to have intermittent action, and to arrange for this the collar O is turned in the opposite direction, thereby forcing the sleeve I forward and putting the spring N' under tension. This results in forcing the supplemental drive-rod N forward, so that normally its rear end is forward of the point of contact with the hammer F'; but whenever the plugger-point Y is pressed against a tooth, as shown in Fig. 1, for example, then the plugger-shank pushes against the wiper, the wiper against the dog, and the shank of the dog against the forward end of the supplemental drive-rod, thus carrying the rear end of said drive-rod N back into position to receive a blow from the hammer F', and this capability of transforming our device from continuous reciprocation to intermittent operation is a very valuable feature of the same.

Oftentimes the position of a cavity in a tooth is such as to render same practically inaccessible to an operator with an ordinary plugger, and therefore the adjustability of the plugger-point within the cylinder U and of said cylinder about the head S' is of great value and importance. By making the part $x$ of the plugger-shank and the bore of the bushing W polygonal in form—as, for example, hexagonal—the plugger-point can be quickly withdrawn from the bushing and turned to the desired position and allowed to be retracted, with different faces of the plugger-shank and bushing-bore in contact, the described transverse pin $y^2$ affording a convenient means of manipulation for this purpose, and if it is desired to vary the angle of the cylinder U and the plugger-point carried thereby with relation to the head S' the collar P is turned, so as to move it backward, (the reduced rear end of said collar being received within the longitudinal annular groove $m^5$ in the casing M,) and then the smooth-bored collar Q is slipped backward over the smooth cylindrical part $m^7$ of said casing M, thereby withdrawing the pointed tongues $q$ $q$ from engagement with the notches V V in the ears $u$ $u$ of the cylinder U, whereupon the inner end $x'$ of the plugger-shank can be withdrawn from the wiper-notch $t$ and head perforation $s$, with which it has been in engagement, and the said cylinder U turned on the pivot-screw T' until the said part $x'$ of the plugger-shank is opposite to the desired point, and then by releasing said plugger-shank the part $x'$ is at once forced by the spring Y' through the desired edge perforation $s$ and seated within the corresponding wiper-notch $t$, after which the collar Q is brought forward till the tongues $q$ $q$ are in engagement with the corresponding notches V V and the collar P screwed forward to secure the parts in their adjusted position, so that the operation of the device (either continuous or intermittent) may proceed as before, but with the plugger-point at the newly-adjusted angle.

As already stated and indicated by the different forms shown in Figs. 1 and 13, plugger-points of variously-formed lower or operative ends may be interchangeably used with our tool, the substitution of one plugger-point for another being as quickly done as the just-described change of position of the plugger-point having the inclined end $y$.

While we have shown and described the plugger-point Y as made separate and detachable from the plugger-shank X, it will be understood that so far as the withdrawing and turning a plugger-point having an inclined end $y$ is concerned, so that the angle of projection of said end $y$ may be varied, precisely the same result could be obtained if the plugger-point Y and shank X were all made in one piece, and hence while we ordinarily prefer to make said part X separate and detachable from the plugger-point we do not wish to be understood as being limited to that construction.

Having thus described our invention, what we claim as new, and desire to secure by Letters Patent, is—

1. In a dental tool, the combination with a tubular casing, of a longitudinally-reciprocating drive-rod supported therein, having a hammer at the forward end thereof, and a single spiral open cam-thread on its rear end; a hollow cap removably secured to the rear end of the casing, and provided with a longitudinal bore through its rear end; a shaft projecting through the bore in the cap end, and adapted for engagement with a flexible shaft, and having a square-sided head extending within the hollow cap; and a nut movable within the said hollow cap and tubular casing, said nut having a square-sided opening at one end for engagement with the said square-sided head, and an inner single spiral open cam-thread for engagement with the cam-thread on said drive-rod.

2. In a dental tool, the combination with a tubular casing, and a hollow cap removably secured to the rear end thereof, said casing having opposed upper and lower slots therein; of a rotatable shaft projecting through the rear end of said hollow cap and having an inner square-sided head; a nut movable within said hollow cap and tubular casing, said nut having a square-sided opening at one end for engagement with the said square-sided head, and an inner single spiral open cam-thread; a longitudinally-reciprocating drive-rod having a hammer at its forward end, and a single spiral open cam-thread on its rear end for engagement with the cam-thread in said nut; upper and lower feathers on said drive-rod; a sleeve surrounding said drive-rod and having upper and lower inner grooves for engagement with said feathers, and upper and lower screw-threaded projections movable within the said upper and lower slots in said tubular casing; and a collar, surrounding said sleeve, and having interior screw-threads for engagement with the said upper and lower screw-threaded projections thereof.

3. In a dental tool, the combination with a tubular casing, and a hollow cap removably secured to the rear end thereof, said casing having opposed upper and lower slots therein; of a rotatable shaft projecting through the rear end of said hollow cap and having an inner projecting head; a nut movable within said hollow cap and tubular casing, said nut being provided with a cam-thread in its bore, and having longitudinal movement on said projecting head; a longitudinally-reciprocating drive-rod having a hammer at its forward end, and a cam-thread at its rear end for engagement with the cam-thread in said nut; a pair of sleeves surrounding said drive-rod, and having upper and lower screw-threaded projections movable within the said upper and lower slots in said tubular casing; a nut on said drive-rod adjacent to the hammer end thereof; a spiral spring surrounding said drive-rod between said nut and the forward sleeve; and a pair of collars surrounding the said pair of sleeves, and having interior screw-threads for engagement with the said upper and lower screw-threaded projections thereof.

4. In a dental tool, the combination with a tubular casing and hollow cap, of a rotatable shaft, projecting through the rear end of said cap, and having an inner projecting head; a nut revoluble within said cap and casing, and longitudinally movable upon said head, and provided with a cam-thread; a longitudinally-reciprocating drive-rod supported within said casing, and provided with a hammer at the forward end and a cam-thread at the rear end for engagement with the cam-thread of the nut; and means for adjusting said drive-rod and nut relatively to each other, whereby a full or lesser stroke of the hammer may be given with each revolution of the nut.

5. In a dental tool, the combination with a tubular casing, and a continuously-operating longitudinally-reciprocating drive-rod supported therein and terminating at its forward end in a hammer; of a supplemental tubular casing removably secured to the main casing; a supplemental drive-rod supported in said supplemental casing; a hollow head secured to said supplemental casing; a wiper pivotally secured within said hollow head; a dog in engagement with said wiper and said supplemental drive-rod; a plugger-point having a reciprocating spring-controlled shank in engagement with said wiper; a tension-spring surrounding said supplemental drive-rod; and means for taking off all tension from said spring, whereby the plugger-point may be successively and regularly operated in continuous reciprocation by the continuously-operating drive-rod, and for putting the said spring under tension, and forcing the supplemental drive-rod forward of the point of contact with the hammer, whereby the said plugger-point will only be operated when it is pressed against a tooth to be operated upon, and the supplemental drive-rod thereby forced back in the path of the hammer of the continuously-operating main drive-rod.

6. In a dental tool, the combination with a tubular casing, and a longitudinally-reciprocating drive-rod supported therein and means for actuating said rod, of a hollow externally-rounded head secured to said casing, and provided with a series of rounded-edge perforations; a wiper pivotally secured within said hollow head and provided with a series of edge notches corresponding to the perforations in said head; a dog in engagement with said wiper and said drive-rod; a cylinder having a pair of ears projecting from the upper or inner end thereof, said ears being pivotally secured to said head, and each ear having a series of edge notches formed therein; a collar longitudinally movable on said tubular casing and having forward-projecting tongues for engagement with said notches; and a plugger-point, having a reciprocating spring-controlled shank supported within said cylinder, and projecting through one of the said edge perforations of said head and within the corresponding edge notch of said wiper, whereby the said plugger-point may be operated by the said wiper at any angle to the said tubular casing to which the said cylinder may have been adjusted.

7. In a dental tool, the combination with a cylinder or casing at one end thereof provided with a polygonal-shaped bore, of a plugger-point having a reciprocating spring-controlled shank and an inclined operative end, together with a polygonal-shaped part removably held within the said polygonal-shaped bore, and adapted to be withdrawn therefrom, turned, and replaced, to vary the direction of projection of the said inclined operative end of the plugger-point.

8. In a dental tool, the combination with a reciprocating shank formed with a socket in its outer end and provided with spring-jaws projecting therefrom, of a plugger-point provided with a post projecting from one end thereof for engagement with said socket, and having the outer surface of said end shaped for engagement with said projecting spring-jaws, whereby the said plugger-point is firmly, but detachably, held to said reciprocating shank.

9. In a dental tool, the combination with a reciprocating shank formed with a socket in its outer end, the upper walls of which socket taper or converge together, and which shank has a pair of opposed spring-jaws projecting from its lower end, of a plugger-point provided with a taper-topped post projecting from its upper end for engagement with said socket, and the outer surface of said upper end of the plugger-point being formed with opposed flat-channeled surfaces for engagement with the said projecting spring-jaws.

In testimony that we claim the foregoing we have hereunto set our hands, at Manitowoc, in the county of Manitowoc and State of Wisconsin, in the presence of two witnesses.

CARL H. SEEGER.
NICHOLAS DEDRICK.

Witnesses:
J. V. MILLER,
FRANK A. MILLER.